UNITED STATES PATENT OFFICE.

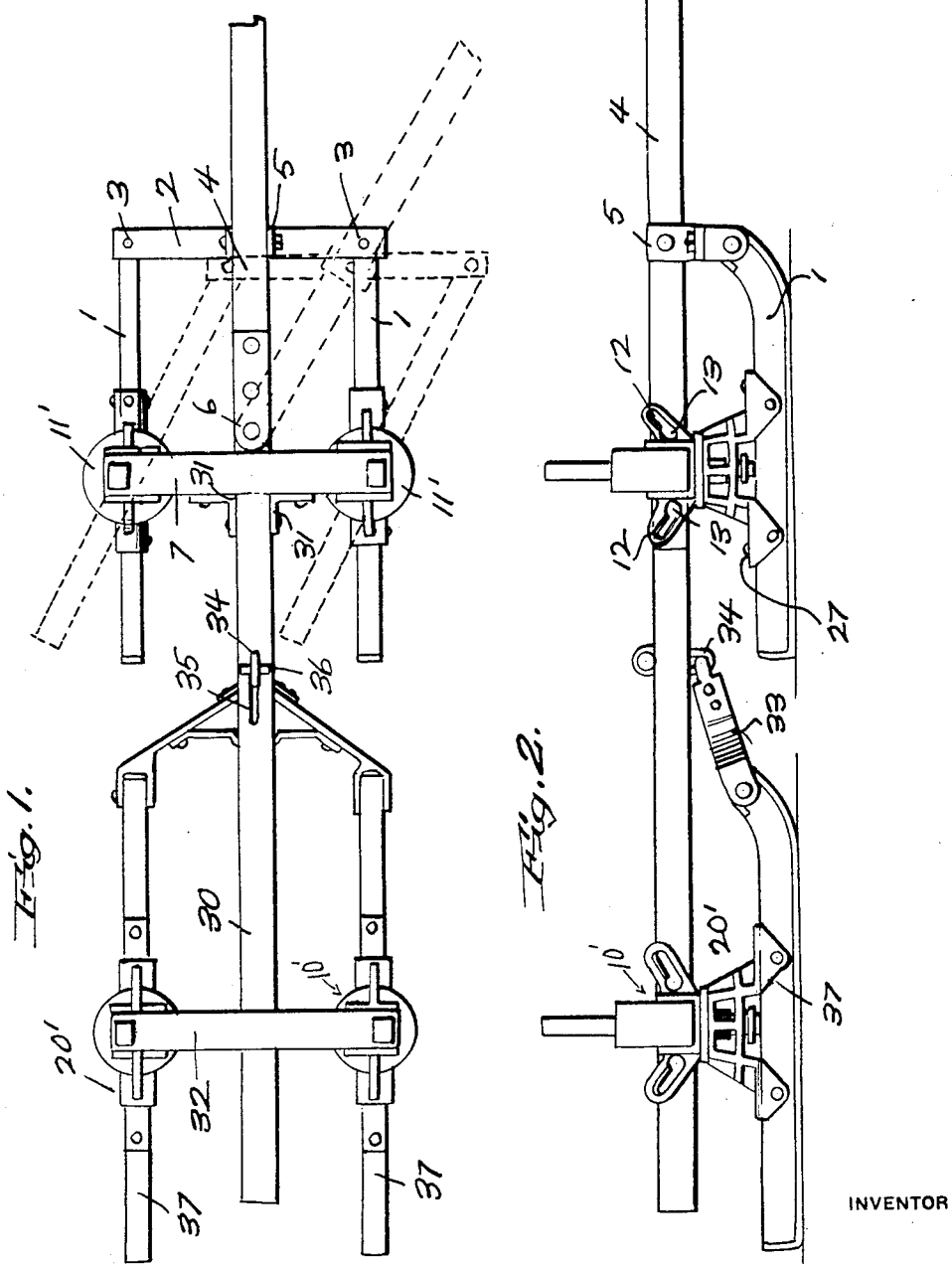

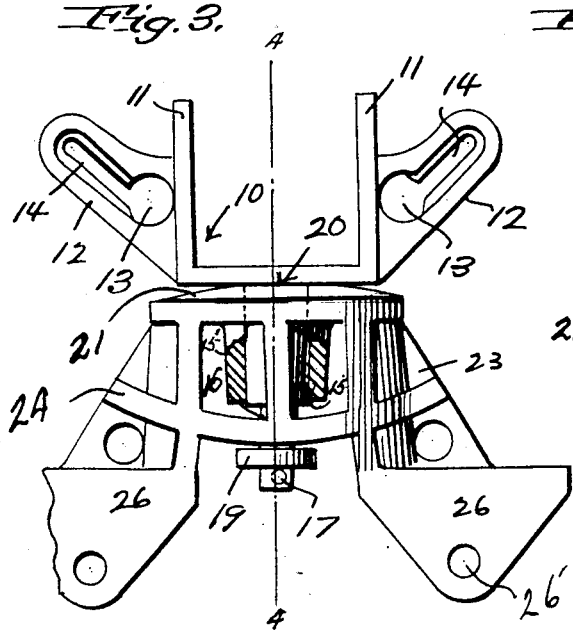
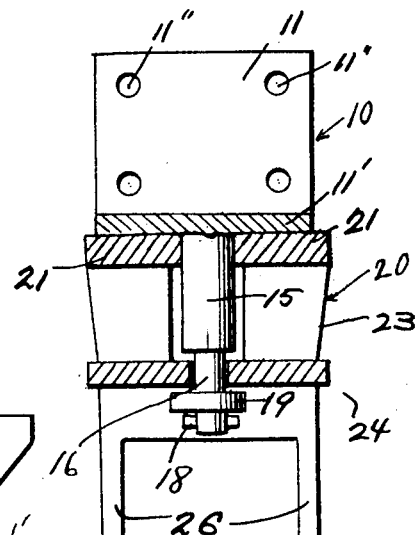
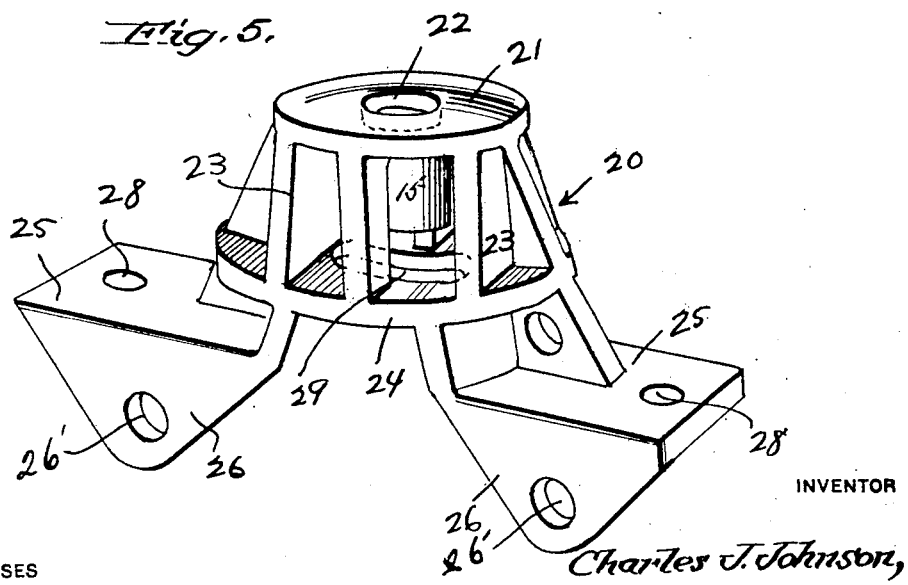

CHARLES J. JOHNSON, OF ELK RIVER, MINNESOTA.

SLED.

1,387,546.  Specification of Letters Patent.  Patented Aug. 16, 1921.

Application filed February 1, 1919. Serial No. 274,426.

*To all whom it may concern:*

Be it known that I, CHARLES J. JOHNSON, a citizen of the United States, residing at Elk River, in the county of Sherburne and State of Minnesota, have invented certain new and useful Improvements in Sleds, of which the following is a specification.

This invention relates to vehicles and more particularly to bob sleds.

The main object of the invention is to construct a flexible, easy turning sled which will not tip over in turning.

Another object is to so construct a sled that the four runners will carry an equal part of the load and the front bob will balance the load as much as the rear bob thereby making it impossible for the sled to be tipped over.

Another object is to provide a sled having pivoted knees constructed so that it can be made lower at the top of the bunks and yet have a greater clearance space below the bunks; which will back and turn easily and when making a short turn will stand crosswise under the load thus providing a sufficient space so that logs or other heavy articles may be skidded or rolled on to the sled with a team or otherwise without danger of the sled capsizing.

Another object is to provide a knee for sleds which when applied to the fore runners of a sled will permit them to pivot similar to the front wheels of an automobile thereby avoiding the necessity of using a rocker or bolster.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a bob sled constructed in accordance with this invention, Fig. 2 is a side elevation thereof, Fig. 3 is an enlarged side elevation of the front knee constituting a portion of this invention, Fig. 4 is a vertical section taken on the line 4—4 of Fig. 3, and Fig. 5 is a detail perspective view of the lower or runner carrying portion of the swivel knee shown in Figs. 3 and 4.

In the embodiment illustrated, a bob sled is shown, the front bob of which has its runners 1 connected by a cross bar 2, the ends of said cross bar being pivoted as shown at 3 to the front ends of the runners 1. This cross bar 2 is preferably in the form of an angle iron and has a pole or tongue 4 fastened thereto by a pivot or clevis 5 for holding the runners in place. The ends of the cross bar 2 being pivoted to the runners provide a very flexible and easy turning sled and one which will not tip over. The ordinary sled tips for the reason that the front rocker or end of the load is not properly supported, the king bolt and rocker plate being its only means of support, consequently when making a short turn, the front rocker has only about four or six inches bearing surface on the center of the bunk on which to place its load, thereby necessitating the load being balanced on the rear bob and should one of the rear runners be suddenly raised or lowered, it affects the whole load, sometimes sufficiently to capsize it. It is to overcome this objection that this swivel casting now to be described was designed. A clevis 6 connects the rear end of the tongue 4 with the bunk 7 of the front bob sled as is shown clearly in Fig. 1.

The front runners 1 are connected to the bunk 7 at the ends thereof by swiveled knees which are exactly alike and consequently one only will be described in detail.

A bunk box 10 shaped to fit and receive one end of the bunk 7 is provided on the outer faces of its side walls 11 with upwardly and outwardly inclined ears 12, each of which has an aperture 13 therein for the passage therethrough of chains for securing the load to the sled. Slots 14 extend longitudinally toward the free ends of the ears 12 and are designed to form locking means for the chains, used in securing the load, one link of which is adapted to be inserted in said slot for securing the chain in adjusted position.

Depending from the bottom of the box 10 is a king bolt 15, the free end of which is reduced as shown at 16 and has an aperture 17 near its terminal for the passage therethrough of a cotter pin 18 and on its reduced portion is mounted a washer 19 against which the cotter pin 18 bears.

The bottom 11' of the box 10 is preferably made round to form a bearing for coöperation with a turn-table of the runner carried member presently to be described, the shape of said bottom member 11' being shown clearly in Fig. 1.

A coöperating swiveled knee member 20 carried by the runner is shown in detail in Fig. 5 and comprises a turntable 21 having a longitudinally convexed transversely rectilinear upper face with a central opening 22 for the passage therethrough of the king bolt 15 which permits the sled to pass over obstructions and yet prevents its wabbling. A sleeve 15' depends from the table 21 forming a socket for bolt 15. Supporting wings or legs 23 radiate from this central aperture and merge at their lower ends into an oval plate 24 which forms a supporting base for these members. Runner attaching plates 25 extend from opposite sides of the member 20 and have depending ears 26 on one face thereof at both side edges which are designed to extend down over the outer and inner faces of the runners 1 and be secured thereto by bolts passing through the apertures 26' in the ears 26 and through the runners. The bolts 27 which fasten the shoes to the runners also extend vertically upward and through apertures 28 in the plates 25 so that the knee member 20 will be securely fixed to the runners.

In connecting the bunk 7 of the sled body to the runners 1 by means of these improved knees, the castings 10 are first fixed to the bunk ends by suitable bolts passing through apertures as 11'' in the side walls of the box 10. The king bolts 15 which are carried by the bottoms 11' of these boxes are then extended through the apertures 22 and sleeves 15' of the knee members 20 carried by the runners and are held engaged with said members by the cotter pins 18 which extend through the depending reduced ends 16 of the bolts. The plates 24 of the members 20 are shown provided with slots as 29 for the passage of the king bolt ends 16. The convexed upper face of the turn table portion 21 of the member 20 provides for a slight rocking movement of the bunk 7 in relation to the runners so that the sled may pass over slight obstacles without interfering with the load and yet not wabble sidewise.

The front bob is connected with the rear bob by a reach 30 which is shown bolted at its front end to brackets 31 carried by the rear face of the bunk 7 of the front bob. This reach 30 is secured at its rear end by any suitable means to the bunk 32 of the rear bob and intermediately of its ends is connected with the front end of said bob by a clevis 33 which has a link 34 extended upwardly through a slot 35 in the reach and held engaged therewith by a pin 36 as is shown clearly in Figs. 1 and 2.

The bunk 32 of this rear bob is fixedly connected with the runners 37 thereof by knees similar in construction to those used on the front bob except that the bunk carried member and the runner carried member of these knees are held in fixed relation by making the apertures in the members 20' angular and by forming the king bolts which depend from the bunk carried members 10' angular to conform to the shape of the sockets so that there can be no turning movement of these parts in relation to each other, and yet will permit the ready separation of the parts when found desirable.

From the above description it will be obvious that when the pole 4 is turned for turning the sled, the front runners being pivotally connected with the cross bar and with the pole, will turn into the dotted line position shown in Fig. 1, so that the weight of the load will at all times be borne by the four runners and not merely by the rear runners, and the front king bolt as in sleds of ordinary construction.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:—

In a sled, runners, a bunk connecting said runners, a box shaped to fit and receive each end of the bunk and provided on its outer face at opposite ends with upwardly and outwardly inclined ears, each having an aperture with a slot extending longitudinally toward the free ends of the ears to form chain locking means.

In testimony whereof I affix my signature in presence of two witnesses.

CHARLES J. JOHNSON.

Witnesses:
CHARLES S. WHEATON,
CHARLES S. WHEATON, Jr.